Oct. 6, 1959  J. MAURICE ET AL  2,907,433
CENTRIFUGAL CLUTCHES
Filed Sept. 10, 1956

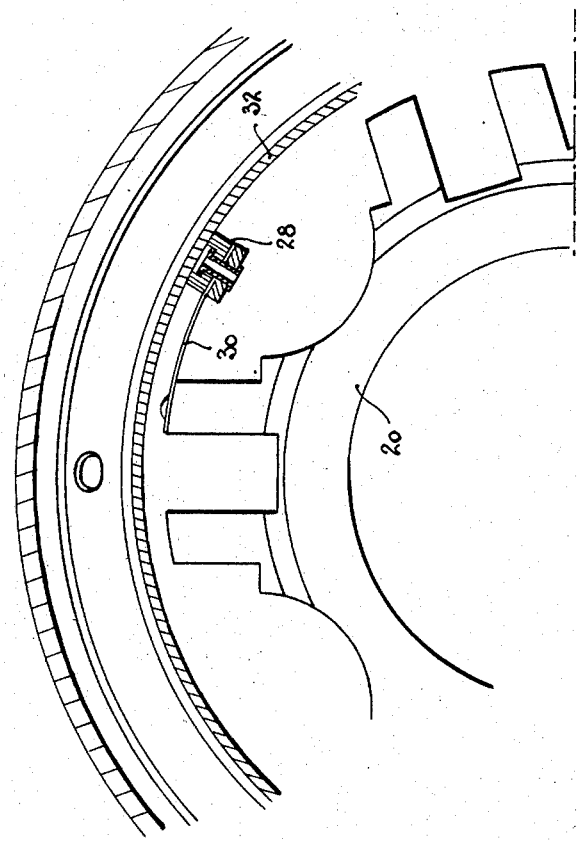
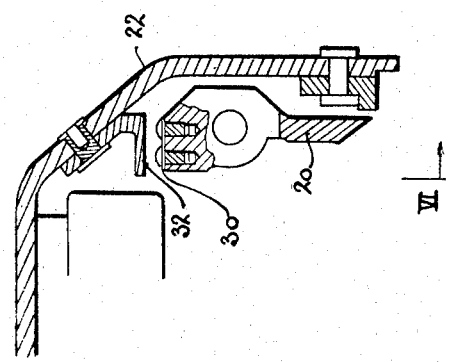

United States Patent Office 2,907,433
Patented Oct. 6, 1959

2,907,433

CENTRIFUGAL CLUTCHES

Jean Maurice and Michel Rist, Paris, France, assignors to Société Anonyme Francaise du Ferodo, Paris (Seine), France, a corporation of France Application September 10, 1956, Serial No. 608,783

Claims priority, application France September 17, 1955

10 Claims. (Cl. 192—105)

The present invention relates to a centrifugal clutch, especially for automobile vehicles, of the type in which the weight-heads are carried by an independent weight-head carrier, which can at will either be left coupled to a casing which is rigidly fixed to the driving shaft, under the action of a force which develops a substantially constant driving torque, and which produces and/or maintains the engagement of the clutch if the speed of the said driving shaft is sufficient, or which can be disconnected from the said casing under the action of a preponderant force. In general, the first force is of an elastic nature, while the second force is produced by the attraction of a fixed locking electro-magnet.

In centrifugal clutches of this latter type, which may be chosen by way of example, when the constant torque driving the weight-head carrier from the driving casing is small, the running-up to speed of the weight-head carrier is slow and the engagement of the clutch has the advantage of an excellent progression. In the case of an automobile vehicle, the driving is then smooth and free from jerks, even of a slight nature, but there is found an annoying lack of rapidity in effecting changes, especially at high speed. When the constant driving couple is made large, there is found on the other hand an inadequate progression which produces jerks at low speeds, while on the other hand there is a good rapidity of operation at high speeds. When the value chosen for the driving couple is a compromise between the small and large values referred to above, all excessive slowness and all risk of excessive jerks is avoided, but the benefits are then lost of the performance of which the clutch would be capable under certain conditions of use.

The present invention has for its object a centrifugal clutch which is free from the drawbacks referred to.

In accordance with the invention, a centrifugal clutch of the kind referred to is characterised by means for modifying, at least during certain periods of use, the driving torque of the weight-head carrier from the casing. These means comprise an auxiliary correcting torque which depends on any appropriate factor, and which is added to or subtracted from the constant driving couple, which is given a small or large value, depending on the case. There is thus obtained at the same time, a great smoothness at low and moderate speeds and an excellent response without shocks at high speeds.

The objects, special features and advantages of the invention will furthermore be brought out from the description which follows below, of forms of embodiment which have been chosen by way of example, reference being made to the accompanying drawings, in which:

Figs. 3, 4, 5 and 7 are views similar to a part of Fig. 1, but which relate to four alternative forms respectively;

Fig. 6 is a view of the alternative form shown in Fig. 5, in cross-section following the line VI—VI of Fig. 5;

Figure 1:
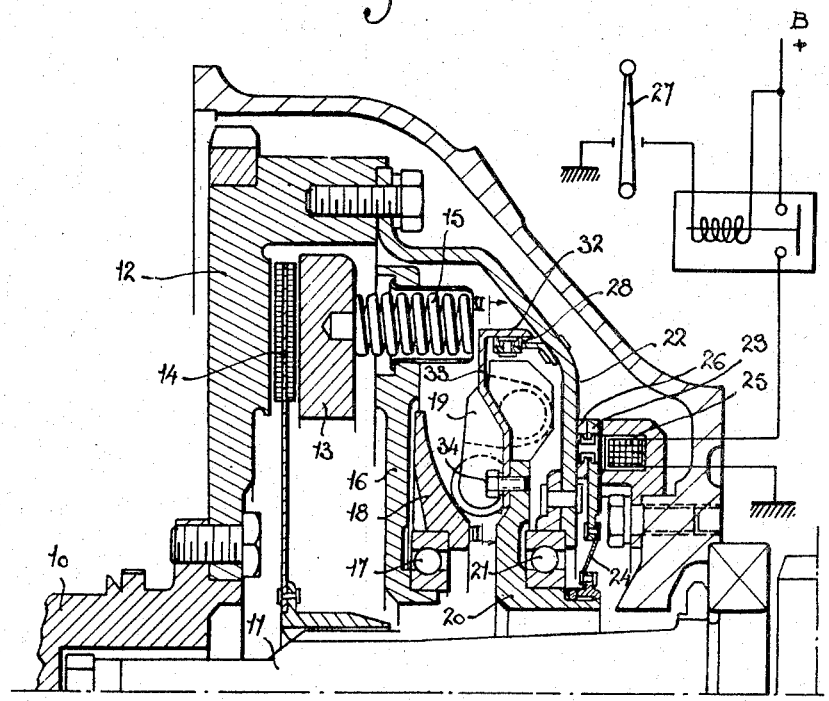
Fig. 1 is a half-view of a centrifugal clutch in accordance with the invention in longitudinal cross-section taken along the line I—I of Fig. 2.
Figure 2:
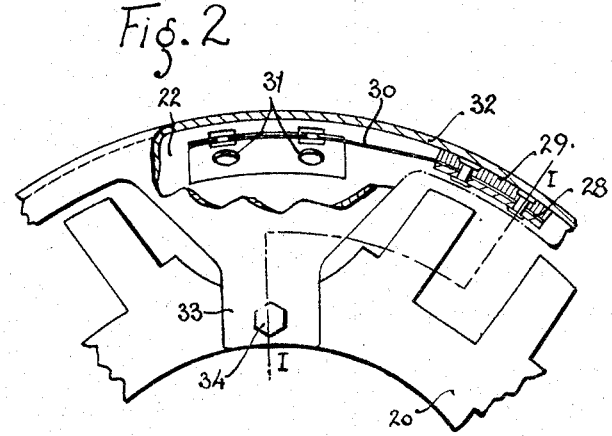
Fig. 2 is a corresponding partial view to a larger scale, in front elevation, with certain parts broken away, following the arrows II—II of Fig. 1.

In the form of construction shown in Figs. 1 and 2 which concerns, by way of example only and without implied limitation, an application of the invention to a centrifugal clutch, especially for automobile vehicles, the weight-head carrier of which may be locked in position at will by the action of an electro-magnet on a sliding member coupled for rotation with the weight-head carrier, there can be seen in Fig. 1, at 10 the driving shaft, and at 11 the driven shaft of the clutch. The driving shaft 10 is rigidly fixed to a fly-wheel 12 which forms a support plate. This plate co-operates with a pressure-plate 13, which is fast for rotation with it, so as to grip a friction disc 14 which is itself fixed for rotation with the driven shaft 11.

The pressure-plate 13 is pushed by means of springs 15 and by a transfer-plate 16. This transfer-plate is fixed for lateral movement with a cam 18 with respect to which it can rotate by means of a bearing 17. With the cam 18 are adapted to co-operate centrifugal pushing weight-heads 19 with rollers, carried by a weight-head carrier 20. The weight-head carrier 20 is mounted free for rotation by means of a bearing 21 in a casing 22 fixed to the driving fly-wheel 12.

A sliding member 23 is mounted rigid in rotation by means of torque applying flexible tongues 24 on the weight-head carrier 20 and can be made coupled either with an electro-locking magnet 25 or with the rotatable driving casing 22. The electromagnet 25 is a torque absorbing means, and when it is released, the flexible tongues 24 form a torque applying means between the casing 22 and the carrier 20. This tongue arrangement has the advantage of permitting the control of the speed of the weight-head carrier without the intervention of sliding means such as splines or flutes which produce noise. A friction lining 26 is provided between the member 23 and the casing 22. The flexibility of the small tongues 24 brings and retains the member 23 in contact with the casing 22, with the interposition of the lining 26, when the electro-magnet 25 is inactive. This electromagnet 25 is supplied from any suitable source of current such as the battery B of the vehicle, and is made active or inactive automatically, depending on whether the gear-changing lever 27 forming a control of the torque absorbing means 25 is operated or released. This lever 27 may be of the so-called "broken" type and is preferably that known by the commercial name of "Ferlec."

In accordance with the invention, as shown in Figs. 1 and 2, torque correcting shoes 28 responsive to centrifugal force and having a surface 29 of friction material, are fixed at the ends of flexible blades 30 which are secured at 31 to the driving casing 22. Each blade 30 extends in a roughly tangential direction and is shaped so as to be able to work in a plane at right angles to the axis of the clutch, which enables the centrifugal friction shoes 28 to move more or less further away from the said axis as a function of the angular speed of the driving casing 22 and of the elastic resistance offered by the blades 30.

It will be noted that the torque correcting means 28 when operative, act between the weight carrier 20 and the casing 22 in a similar manner as the torque applying means 24 when operative. But the torque correcting means 28 are sensitive to the casing speed and enter into action only when a predetermined casing speed is reached, while the torque applying means 24 is of constant load, irrespective of any speed, and is active when the electromagnet 25 is inactive. The means 28 is added to the means 24 when the casing speed is sufficient. When the electromagnet 25 is rendered inactive the carrier 20 is at first stationary and a slipping phase is involved between the rotating casing 22 and the carrier 20 through the means 28 alone, or through means 24 and 28.

When the speed of the casing 22 is moderately accelerated, but not enough to reach the speed to make the means 28 active, this slipping phase is involved through the means 24 alone to quite a length. After the units 22 and 20 rotate in unison, and the casing speed is sufficiently high, the means 28 add their action to that of the means 24. On the contrary, when the speed of the casing 22 is rapidly accelerated, to rapidly reach the speed to make the means 28 active, the slipping phase is involved through both means 24 and 28, and is thus shortened. Means 28 add their action to that of means 24 almost as soon as the electromagnet 25 is rendered inactive.

In more detail, the friction surfaces 29 of the shoes 28 co-operate with a cylindrical track 32 fixed by lugs 33 and screws 34 to the weight-head carrier 20. The elastic resistance offered by the blades 30 to the lifting of the shoes 28 is preferably so arranged that the surfaces 29 begin to come into contact with the track 32 at an angular speed of the casing 22 less than the normal engine speed above which the maximum torque can be transmitted at 12—14—13. This angular speed of the casing is preferably chosen close to that which corresponds, on the average, to the changing of the gears.

The calibration of the torque applying small flexible tongues 24 is moreover chosen in such a way as to ensure the transmission of the torque at 26 which corresponds to the highest qualities of progression of the clutch at low speeds. The presence of the coupling 28—32 in the control of the coupling precisely prevents such a choice, which is an advantage at low speeds, from resulting in slow operation at high speeds.

When the user is not in a hurry and particularly wishes to drive comfortably, he will only accelerate his engine moderately before varying the combination of speeds. During the course of re-engaging gears, the shoes 28 do not come into contact with the track 32, and everything goes on in the same way as with a normal centrifugal clutch, the auxiliary control of which has been designed to be particularly smooth and very progressive.

If, on the other hand, the user is in a great hurry and wishes to use rapid acceleration, he will instinctively accelerate his engine which reaches a high speed when the gear lever is released after a fresh gear has been engaged. From that moment, the centrifugal shoes 28 come into action and considerably reduce the time which is required for the weight-head carrier to apply a grip to the friction disc 14 corresponding to the transmission of the maximum torque.

The vehicle thus behaves in all circumstances exactly as the user wishes. In addition to such an advantage of automatically adapting the rapidity of engagement of the clutch to the will of the user, the arrangement in accordance with the invention enables the danger of skidding of the driving wheels of the vehicle to be avoided or reduced. This danger is in fact present especially at the moment when the engine is idling and when the driven shaft is brought up to high speed by the engagement of a lower gear; it will be appreciated that then, by virtue of the invention, the bringing up to speed of the weight-head carrier is precisely made longer by the sole intervention of a small constant torque at the beginning of the engagement.

Figure 3:
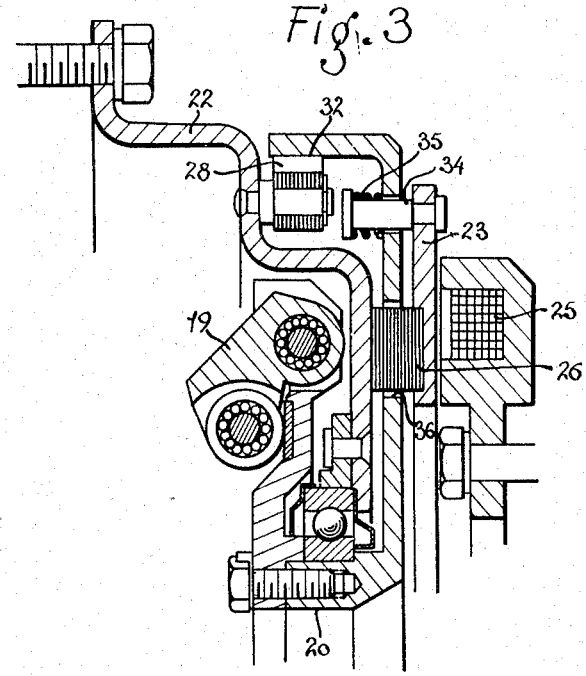

Reference will now be made to Fig. 3, in which the arrangement is similar to that which has just been described, but in which the friction track 32 and the shoes 28, which are pivoted, are external to the casing 22 in order to avoid the dust which could be produced by the friction of certain linings at 28—32 from reaching the deight-head mechanism 19. The member 23 is in this case coupled by its periphery to the weight-head carrier 20 by means of small pillars 34 which are supported against the weight-head carrier 20. The lining 26 consists of cylindrical members fixed to the member 23 and engaging with the casing 22 after passing through holes 36 formed in the weight-head carrier 20.

In the forms of embodiment of Figs. 1 and 2 and of Fig. 3, the shoes 28 which slide usefully against the plate 32 at the moment when gears are re-engaged, may also sometimes slide without useful purpose against this track, especially when the engine is running very fast and the electro-magnet is maintained active. It should however be observed that such periods of useless contact are too short to be really troublesome. In accordance with the invention furthermore, they may be eliminated completely, as will now be described with reference to Fig. 4.

Figure 4:
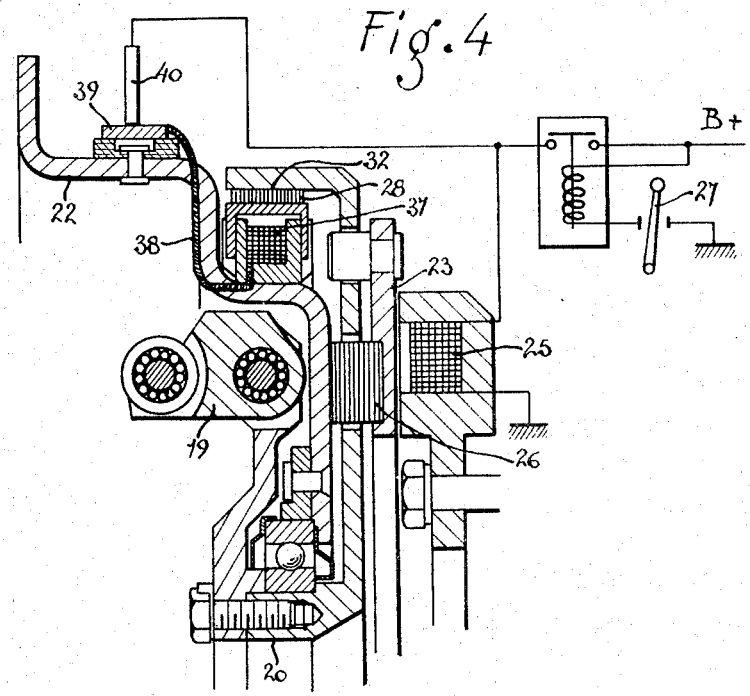

The arrangement shown in Fig. 4 is similar to that of Fig. 3, in which there will be recognized at 32 the friction track with the shoes 28, at 23 the sliding member with its friction members 26 of suitable friction material, and at 22 the driving casing on the outside of which are arrange the track 32 and the shoes 28, the latter being however subjected to the action of an electro-magnet 37 which, when it is excited, prevents them from being forced against the track 28 under the effect of centrifugal force.

The electro-magnet 37 is connected at 38 to a collector ring 39 mounted on the casing 22 and co-operating with a brush 40. The brush 40 is supplied in parallel with the electro-magnet 25 whenever the gear-changing lever 27 is operated. By virtue of this arrangement, the shoes 28 are rendered inactive when the electro-magnet 25 is maintained active, and all troublesome slip is thus avoided.

Reference will now be made to Figs. 5 and 6, in which the arrangement comprises, like that which has been described with reference to Figs. 1 and 2, a co-operation by friction of the weight-head carrier 20 and the driving casing 22. The friction track 32 is in this case however fixed to the casing 22, while the blades 30 carrying the centrifugal shoes 28 are fixed to the weight-head carrier 20.

The resistance offered by the blades 30 to the lifting of the shoes 28 is in this case given such a value that the shoes 28 begin to touch the track 32 at an angular speed of the weight-head carrier 20 which is substantially less than the engine speed above which the maximum torque can be transmitted at 12—14—13. To give an example, this angular speed may be chosen in the vicinity of half the engine speed, and in all cases it will be as small as possible, taking account of the desired progression.

The weight-head carrier will thus be brought up to speed in two stages, the first being a normal stage without any intervention of the torque correcting coupling at 28—32, the second being rapidly accelerated with the intervention of this coupling. Such an acceleration at the end of the coupling period does not generally give rise to shocks, not even very slight shocks.

While the arrangement of Figs. 1 and 2 enables the global speeding-up of the weight-head carrier to be reduced when the user shows his desire to accelerate the operations, the arrangement of Figs. 5 and 6, in a given duration of speeding-up of the weight-head carrier, thus enables the fraction of that period to be prolonged which corresponds to a sensitivity to shocks and to shorten the fraction following, during the course of which the shocks are much less evident.

By a simple adaptation of the shoes 28 and the blades 30, that is to say by means of a large number of convenient parameters, it is possible to seek and to readily obtain in each particular case, the optimum conditions of operation, while retaining the same standard model of cam 18, whereas it would be long and expensive to adapt a form of cam for each particular application.

Figure 8:
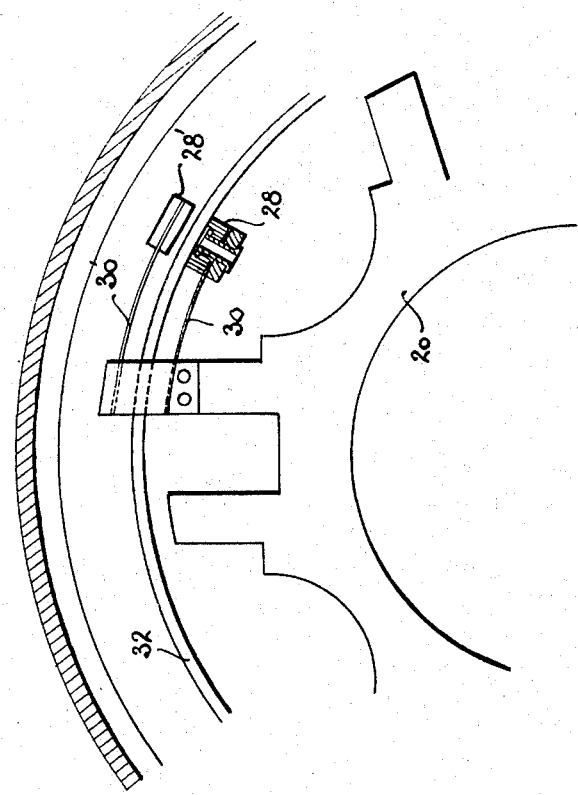
Fig. 8 is a view of the alternative form shown in Fig. 7, in cross-section along the line VIII—VIII of Fig. 7.
Figure 7:
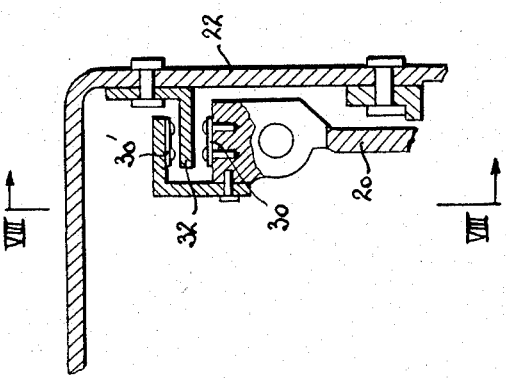

Reference will now be made to Figs. 7 and 8, in which the arrangement is similar to those of Figs. 5 and 6, except that to the set of centrifugal shoes 28 with blades 30, there is added a further set 28' of spring blades 30' acting in the opposite direction, for example on the other side of the track 22. The shoes 28' remain in contact with the track 32 due to the elastic force of the spring blades 30' up to a given low value of the speed of the weight-head carrier, corresponding for example to the idling speed of the engine, and then move away from the track due to the effect of centrifugal force which has become preponderant.

As soon as the weight-head carrier is freed after engagement of a different gear, it is rapidly driven up to the idling speed of the engine. At this speed, no torque is yet applied to the main friction surfaces of the clutch. This first phase of speeding-up of the weight-head carrier thus does not require any precautions and enables the clutch time to be reduced without detriment to the progression.

The shoes 28 act in the same way as in the form of embodiment shown in Figs. 5 and 6.

Figure 9:
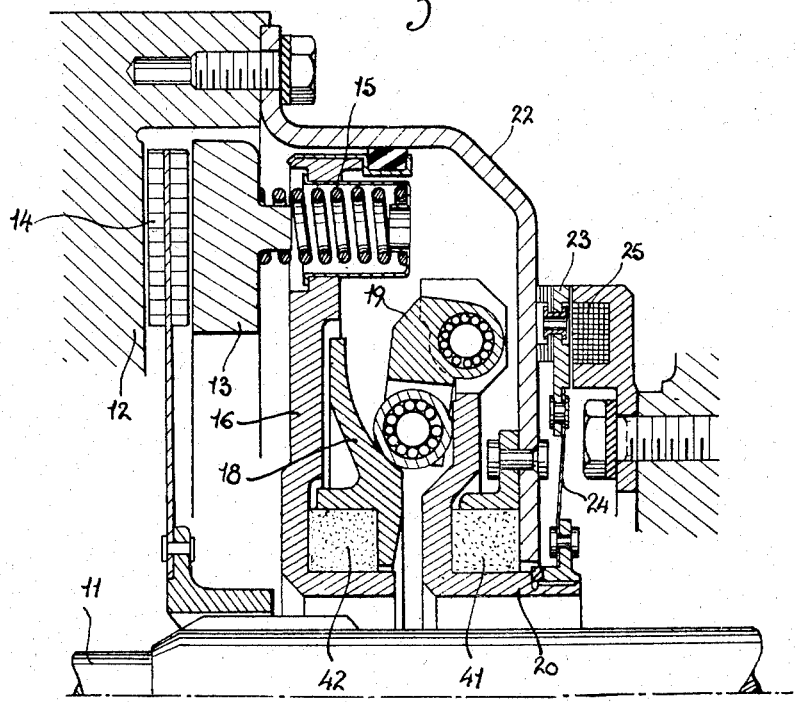
Fig. 9 is a half-view similar to that of Fig. 1, but comprises a modified assembly.

Reference will now be made to Fig. 9, in which the arrangement is again similar to those which have been described above, but in which the friction produced between the driving casing 22 and the weight-head carrier 20 with the object of speeding-up the said carrier, is effected by means of a ring 41 of graphite or calcined material or other self-lubricant, the ring 41 serving to replace the bearing 21. In this case, the supplementary driving torque is coupled with the axial force applied between the weight-heads and the cam. This force varies in dependence on the speed of the weight-head carrier. A further ring 42 of the same type as the ring 41 may be provided in addition as a replacement for the bearing 17 between the cam 18 and the transfer-plate 16. It should be noted that rings of the kind shown at 41 and 42 are especially well adapted to the transmission of axial forces with or without rotation.

In all the forms of embodiment which have been described above, the driving torque of the weight-head carrier 20 from the casing 22 has been made small, and there has been added to it an auxiliary torque intended to ensure an adaptation to the conditions of operation.

In the forms of embodiment which will now be described, the driving torque of the weight-head carrier 20 from the casing 22 has on the contrary been made large and there is opposed to it an auxiliary torque of the value required, either by a moderate supply of the electro-magnet of the clutch or by a braking action on the weight-head carrier.

Figure 10:
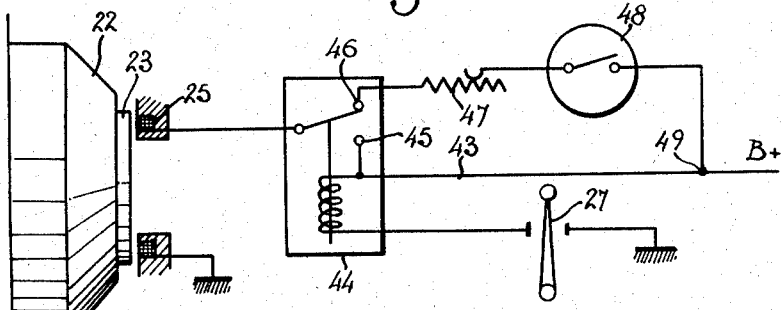
Fig. 10 is a diagrammatic view of a further alternative form.

Reference will first of all be made to Fig. 10, in which there will be recognized at 22 the driving casing, at 23 the member which is fast for rotation with the weight-head carrier and at 25 the electro-magnet for locking the member 23 in position.

The electro-magnet 25 is normally supplied by a circuit 43 connected to the battery B with a switch 27 controlled by the lever or rod system of the gear box of the vehicle. This circuit comprises a relay 44, the working contact terminal of which is shown at 45.

In accordance with the invention, to the rest-contact terminal 46 of the relay 44 are connected in series a torque correcting resistance 47 and a contactor 48. The resistance 47 may be fixed or variable in dependence on the travel of the accelerator pedal or of the engine speed. The contactor 48 is connected directly at 49 to the battery B. The contactor 48 may be centrifugal, with a time-delay, or controlled by the accelerator pedal.

When changing gears, the contact of the lever 27 being closed, the relay 44 is energised as is also the electro-magnet 25. The member 23 which is normally applied elastically against the casing 22 is attracted. The weight-head carrier is then de-coupled from the driving casing 22.

When the contact of the lever 27 is opened, during the time of passage of the blade of the relay 44 from the working contact 45 to the rest-contact 46, the electro-magnet 25. The member 23 which is normally applied closed, but by the resistance 47. The result is that the attraction on the member 23 is insufficient to pull this away from the driving casing 22 while the relative force of application is thereby diminished. The clutch operates without shocks.

This auxiliary excitation due to the torque correcting resistance 47 will depend on the value of this resistance. Its effect and especially its duration will depend in addition on the nature of the contactor 48. The resistance and the contactor may be adjusted as a function of the effect it is desired to obtain.

Figure 11:
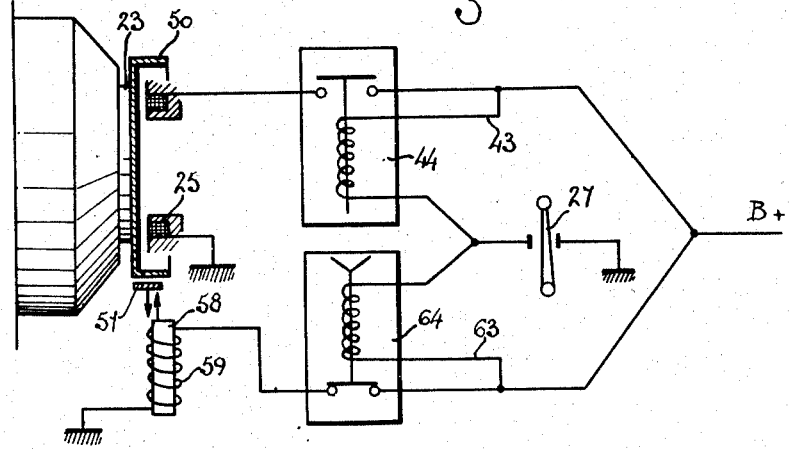
Fig. 11 is a view similar to that of Fig. 10, but which relates to a still further alternative form of embodiment.
Figure 12:
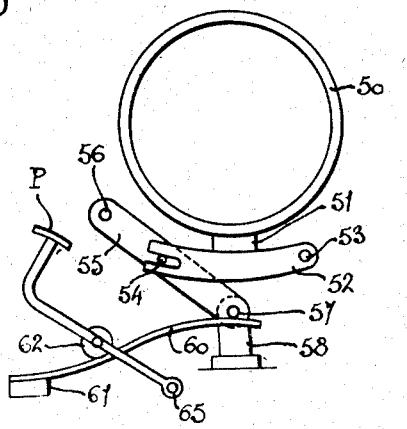
Fig. 12 is a view in profile corresponding to Fig. 11, and shows the mechanical transmission of the device.

In the form of embodiment shown in Figs. 11 and 12, the weakening of the driving torque of the weight-head carrier by the driving casing is obtained by the application of an opposing torque to the weight-head carrier. The member 23 carries a drum 50 on which a shoe 51 is frictionally engaged. This torque correcting shoe 51 is fixed on a lever 52 pivoted at 53 to the frame of the engine. The lever 52 is controlled at its extremity opposite to the pivot 53, by a pivot 54 carried by a step-down lever 55 pivoted at 56 on the frame. The other extremity of the lever 55 is pivoted at 57 on the plunger core 58 of an electro-magnet 59 fixed to the frame. A blade spring 60 fixed to the frame at 61 is applied against the extremity 57 of the lever 55. On the other hand, a small wheel 62 is coupled to the accelerator pedal P which is pivoted on the frame at 65. The small wheel 62 is in contact with the spring 60 and eases the pressure of this spring in dependence on the travel of the pedal P, this easing effect increasing as the pedal is further depressed.

The electro-magnet 59 is supplied from the battery B by the circuit 63 comprising the relay 64. The electro-magnet 25 is connected to the battery B through the circuit 43 which comprises the relay 44. In the two circuits 43 and 63 is provided the switch 27 which is coupled to the gear-changing mechanism.

During normal running, the electro-magnet 59 is continuously energised. At the moment of changing gears, the time-delay relay 64 is energised at the same time as the clutch relay 44. The circuit of the electro-magnet 59 is then opened. The spring 60 can then act on the lever 55 and in consequence applies the shoe 51 against the drum 50 through the lever 52, thus reducing the driving torque of the member 23 and thereby the drive of the weight-head carrier.

In dependence on the position of the accelerator, the cam 62 acts to reduce to a greater or less extent the force of the spring blade 60. When the accelerator is operated rapidly so as to obtain a high acceleration, the action of the spring 60 is annulled by the depression of the pedal P; the braking torque applied at 51 is small and the drive applied to the weight-head carrier is rapid. When on the contrary the accelerator is only slightly depressed, the spring 60 acts with its maximum force; the drive of the weight-head carrier is slowed down and the acceleration is gradual. At the end of a certain period, the time-delay relay 64 re-establishes the circuit of the electro-magnet 59 of the brake 51 and frees the weight-head carrier from the braking action.

What we claim is:

1. In a centrifugal clutch comprising a driving unit, a driven assembly adapted to be driven by said driving unit through frictional engagement, a weight carrier, a transfer assembly associated with said carrier for producing said frictional engagement depending upon the speed of the weight carrier, a torque applying means operable between said driving unit and said carrier, a stationary unit, torque absorbing means operable between said stationary unit and said carrier, a control for making said absorbing means active when actuated and inactive when released, said applying means being active only if said control is released, the combination with said means of variable torque correcting means between one of said units and said carrier, said correcting means regulating the picking up of speed of said carrier by said applying means from said driving unit when said control has just been released.

2. A clutch as claimed in claim 1 wherein said applying means comprises a member fast for rotation with the said carrier and coupled thereto by an elastic device permitting the said member to move axially and frictionally applies said member against said driving unit when said control is released, while said absorbing means comprises a stationary electro-magnet.

3. In a centrifugal clutch comprising a driving unit, a driven assembly adapted to be driven by said driving unit through frictional engagement, a weight carrier, a transfer assembly associated with said carrier for producing said frictional engagement dependent on the speed of the weight carrier, a torque applying means operable between said driving unit and said carrier, a stationary unit, a torque absorbing means operable between said stationary unit and said carrier, a control for making said absorbing means active when actuated and inactive when released, said applying means being active only if said control is released, the combination with said means of variable torque correcting means between said driving unit and said carrier, said correcting means having centrifugal shoes connected to said driving unit and frictionally engaging said carrier dependent on the speed of the driving unit, said shoes increasing the picking up speed of said carrier by said applying means if the speed of the driving unit is high when said control has just been released.

4. A clutch as claimed in claim 3, further comprising retaining means for maintaining said frictional shoes remote from said driving unit, said retaining means being sensitive to the actuated condition of said control, thereby retaining said shoes from frictionally engaging said carrier when said control is actuated.

5. In a centrifugal clutch comprising a driving unit, a driven assembly adapted to be driven by said driving unit through frictional engagement, a weight carrier, a transfer assembly associated with said carrier for producing said frictional engagement dependent on the speed of the weight carrier, a torque applying means operable between said driving unit and said carrier, a stationary unit, a torque absorbing means operable between said stationary unit and said carrier, a control for making said absorbing means active when actuated and inactive when released, said applying means being active only if said control is released, the combination with said means of variable torque correcting means between said driving unit and said carrier, said correcting means having centrifugal shoes connected to said carrier and frictionally engaging said driving unit dependent on the speed of the carrier, said shoes increasing the picking up speed of said carrier by said applying means if the speed of the carrier is rapidly rendered high when said control has just been released.

6. In a centrifugal clutch comprising a driving unit, a driven assembly adapted to be driven by said driving unit through frictional engagement, a weight carrier, a transfer assembly associated with said carrier for producing said frictional engagement, dependent on the speed of the weight carrier, a torque applying means operable between said driving unit and said carrier, a stationary unit, a torque absorbing means between said stationary unit and said carrier, a control for making said absorbing means operable when operated and inactive when released, said applying means being active only if said control is released, the combination with said means of variable torque correcting means between said driving unit and said carrier, said correcting means having a friction ring frictionally engaging said carrier and said driving unit dependent on the speed of the carrier, said ring increasing the picking up speed of said carrier by said applying means if the speed of the carrier is rapidly rendered high when said control has just been released.

7. In a centrifugal clutch comprising a driving unit, a driven assembly adapted to be driven by said driving unit through frictional engagement, a weight carrier, a transfer assembly associated with said carrier for producing said frictional engagement dependent on the speed of the weight carrier, a torque applying means operable between said driving unit and said carrier, a stationary unit, a torque absorbing means between said stationary unit and said carrier, a main control making said absorbing means active when actuated and inactive when released, said applying means being active only if said main control is released, the combination with said means of variable torque correcting means between said stationary unit and said carrier, said correcting means comprising an auxiliary control partially and variably energizing said absorbing means when said main control is released and delaying the restoring thereof to a fully inactive position, said auxiliary control braking the picking up speed of said carrier by said first means when said main control has just been released.

8. In a centrifugal clutch comprising a driving unit, a driven assembly adapted to be driven by said driving unit through frictional engagement, a weight carrier, a transfer assembly associated with said carrier for producing said frictional engagement dependent on the speed of the weight carrier, a torque applying means operable between said driving unit and said carrier, a stationary unit, a torque absorbing means operable between said stationary unit and said carrier, a control making said absorbing means active when operated and inactive when released, said applying means being active only if said control is released, the combination with said means of variable torque correcting means between said stationary unit and said carrier, said correcting means comprising a brake frictionally variably engaging said carrier, the said brake braking the picking up speed of said carrier by said applying means when said control has just been released.

9. In combination with the clutch as claimed in claim 8, movable control means controlling the speed of said driving unit and means connected with said speed control means and responsive to the position of said speed control means to decrease the braking effort of said brake when said speed control means is in position for higher speed.

10. In a centrifugal clutch, comprising a driving unit, a driven assembly adapted to be driven by said driving unit through frictional engagement, a weight carrier, a transfer assembly associated with said carrier for producing said frictional engagement dependent on the speed of the weight carrier, a torque-applying means operable between said driving unit and said carrier, a stationary unit, a torque-absorbing means operable between said stationary unit and said carrier, a control for making said torque-absorbing means active when actuated and inactive when released, said torque-applying means being active only if said control is released, variable torque-modifying means between said driving unit and said carrier, said torque-modifying means having first centrifugal shoes connected to said carrier and frictionally engaging said driving unit when the speed of said carrier is below a selected speed, and second centrifugal shoes connected to said carrier and frictionally engaging said driving unit when the speed of the carrier exceeds a selected speed, said second shoes increasing the picking up speed of said carrier by said torque-applying means if the speeds of said driving unit and carrier are rapidly raised when said control has just been released.

References Cited in the file of this patent

UNITED STATES PATENTS 2,447,007 Gravina et al. ---------- Aug. 17, 1948

FOREIGN PATENTS 631,783 Great Britain ----------- Nov. 9, 1949
1,075,696 France ---------------- Apr. 14, 1954